United States Patent
Jun

(10) Patent No.: US 7,110,475 B2
(45) Date of Patent: *Sep. 19, 2006

(54) DIGITAL TV RECEIVER

(75) Inventor: Jung Sig Jun, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 29 days.

This patent is subject to a terminal disclaimer.

(21) Appl. No.: 10/761,754

(22) Filed: Jan. 20, 2004

(65) Prior Publication Data

US 2004/0150754 A1 Aug. 5, 2004

(30) Foreign Application Priority Data

Jan. 20, 2003 (KR) .................. 10-2003-0003731

(51) Int. Cl.
H04L 27/14 (2006.01)
H04N 5/44 (2006.01)

(52) U.S. Cl. .................. 375/326; 348/553; 348/725

(58) Field of Classification Search ............. 375/326, 375/316, 321, 350, 261, 340, 270; 348/325, 348/725, 726; 329/304, 306, 307, 308, 357
See application file for complete search history.

(56) References Cited

U.S. PATENT DOCUMENTS

| 5,673,293 | A | * | 9/1997 | Scarpa et al. | 375/321 |
| 5,872,815 | A | * | 2/1999 | Strolle et al. | 375/321 |
| 6,160,443 | A | * | 12/2000 | Maalej et al. | 329/304 |
| 6,771,714 | B1 | * | 8/2004 | Liu et al. | 375/326 |
| 6,862,325 | B1 | * | 3/2005 | Gay-Bellile et al. | 375/340 |
| 2004/0136474 | A1 | * | 7/2004 | Hwang | 375/326 |
| 2004/0161056 | A1 | * | 8/2004 | Jun et al. | 375/326 |

FOREIGN PATENT DOCUMENTS

JP  2002-252574  9/2002

* cited by examiner

Primary Examiner—Robert Pascal
Assistant Examiner—Krista M. Flanagan
(74) Attorney, Agent, or Firm—Lee, Hong, Degerman, Kang & Schmadeka

(57) ABSTRACT

A digital TV receiver includes an A/D converter for converting an analog signal into a digital signal, a carrier recovery for converting the digital passband signal into a digital baseband signal, and a symbol clock recovery for converting digital baseband real/imaginary component signals into OQAM type of real/imaginary component signals, detecting timing error information by high-passband-filtering, squaring, and adding the OQAM real/imaginary signals, and for generating and outputting the at least two times the frequency of the symbol clock corrected from the detected timing error information.

15 Claims, 6 Drawing Sheets

DIGITAL TV RECEIVER

CROSS-REFERENCE TO RELATED APPLICATIONS

This application claims the benefit of Korean Application No. P2003-03731, filed on Jan. 20, 2003, which is hereby incorporated by reference as if fully set forth herein.

BACKGROUND OF THE INVENTION

1. Field of the Invention

The present invention relates to a digital TV receiver, and more particularly, to an apparatus of a digital TV receiver for recovering a symbol clock from received data.

2. Description of the Related Art

An advanced television systems committee (ATSC) 8 VSB (Vestigial Side Band) transmission system proposed by most current digital transmission systems and a US directed digital TV transmission mode loads data only in a transmission signal to increase an effect of a frequency. That is, clock information needed for data recovery at a receiving party is not transmitted. Therefore, the same clock as that employed during the transmission should be generated among the received signals having only data to recover the data at the receiving party. A symbol clock recovery performs the role.

FIG. 1 is a block diagram illustrating a general digital TV receiver having such symbol clock recovery. Referring to FIG. 1, if a radio frequency (RF) signal modulated in a VSB mode is received through an antenna 101, a tuner 102 selects a desired channel frequency. Then, the tuner 102 converts a VSB signal of an RF band inserted in the channel frequency to a first intermediate frequency (IF) band, and outputs to an analog processor 103. The analog processor 103 performs passband filtering and gain controlling to the first if signal outputted from the tuner 102 for converting the first IF signal into a second IF signal, and outputs to an A/D (Analog/Digital) converter 104. The A/D converter 104 digitizes and outputs the second IF signal to a phase splitter 105.

The phase splitter 105 splits the digital signal into a passband real signal (r(t)) and a passband imaginary signal (i(t)), and outputs the signal to a carrier recovery 106. At this time, for an easier description, the real/imaginary signals outputted from the phase splitter 105 are named as I and Q signals, respectively.

The carrier recovery 106 converts the I and, Q passband digital signals outputted from the phase splitter 105 to baseband digital signals. The output signals of the carrier recovery 106 are also outputted to a symbol clock recovery 107, and a digital processor 108 for performing channel lighting, phase tracking, and an error correcting.

FIG. 2 is a block diagram of a conventional structure of the carrier recovery 106 employing a FPLL (Frequency Phase Locked Loop). That is, the carrier recovery 106 having the FPLL demodulates the I and Q passband signals outputted from the A/D converter 104 into the baseband I and Q signals for frequency and phase locking.

Referring to FIG. 2, the passband I and Q signals being digitized through the A/D converter 104 and the phase splitter 105 are inputted to a complex multiplier 201 of the carrier recovery. At this time, the real signal (r(t)) and the imaginary signal (i(t)) outputted from the phase splitter 105 is expressed as a following formula.

$r(t)=\{I(t)+p\}\cos(w_c t+\psi)-Q(t)\sin(w_c t 30 \psi)$     [Formula 1]

$i(t)=\{I(t)+p\}\sin(w_c t+\psi)+Q(t)\cos(w_c t+\psi)$

In this case, I(t) is a signal before a modulation and p is a pilot signal inputted to the transmitter for the carrier recovery. Also, $w_c$ is the frequency of the carrier signal existing in an input signal and psi is a phase of the carrier signal existing in the input signal. Q(t) is an orthogonal signal component of I(t).

Meanwhile, the complex multiplier 201 of the carrier recovery 106 multiplies the passband r(t) and i(t) signals as the formula 1 by a standard carrier signals NCO (Number Controlled Oscillator) I and NCOQ outputted from the NCO 205, and converts the passband r(t) and i(t) signal into the baseband I and Q signals (I'(t), Q'(t)) as a following formula 2.

$I'(t)=\{I(t)+p\}\cos(\Delta w_c t+\psi)-Q(t)\sin(\Delta w_c t+\psi)$     [Formula 2]

$Q'(t)=\{I(t)+p\}\sin(\Delta w_c t+\psi)+Q(t)\cos(\Delta w_c t+\psi)$

In this case, the $\Delta w_c$ is a beat frequency of the carrier signal ($w_c$) employed by the transmitter and the standard carrier signals NCOI and NCOQ generated from the receiver.

The I and Q signals of the baseband are outputted to a low pass filter 202 as well as to the symbol clock recovery 107 and the digital processor 108.

The low pass filter 202 filters the I'(t) and Q'(t) signals to detect the carrier and outputs to an error detector 203. That is, the carrier recovery 106 recovering the carrier needs only signals around the frequency having the pilot frequency in a band width of 6 MHz and, therefore, the low pass filter 202 prevents the efficiency of the carrier recovery from being reduced by removing the remaining frequency component having data component from the I'(t) and Q'(t) signals.

The error detector 203 detects remaining error of the carrier from the carrier signal, and outputs to the low pass filter 204. That is, the remaining carrier error detected from the error detector 203 is outputted to an NCO 205 through the low pass filter 204 to prevent errors from being accidentally detected. The NCO 205 generates new carrier signals NCOI and NCOQ and outputs to the complex multiplier 201.

If the carrier recovery is completely performed at the carrier recovery 106, $\Delta w_c t$ and $\psi$ become '0', and the formula 2 will be changed to a following formula 3.

$I'(t)=I(t)+p$     [Formula 3]

$Q'(t)=Q(t)$

The symbol clock recovery 107 performs the symbol clock recovery from the signal of the formula 3 and generates the symbol clocks employed in all digital areas of the receiver.

However, if the carrier recovery is not completely carried out in the carrier recovery 106, the symbol clock recovery 107 recovers the symbol clock from the signal of the formula 2. Thus, the symbol clock recovery 107 is not normally performed being influenced by the frequency and the phase between the carrier signals employed by the receiver and the standard carrier signal generated from the receiver such as $\Delta wc$ and $\Psi$.

In other words, as described in FIG. 1, the performance of the carrier recovery largely influences the performance of the symbol clock recovery in a structure the carrier recovery and the symbol clock recovery is connected. The symbol clock recovery is influenced by the remaining frequency and phase error not completely removed from the carrier recovery, and that gives bad influence on the total performance of the symbol clock recovery.

The reason why the symbol clock recovery is located at an end of the general carrier recovery is that the symbol clock recovery is designed under an assumption that the role of the carrier recovery is completed. Therefore, if the carrier recovery is not completely performed, the symbol clock recovery is not performed as well.

SUMMARY OF THE INVENTION

Accordingly, the present invention is directed to a digital TV receiver for recovering a symbol clock that substantially obviates one or more problems due to limitations and disadvantages of the related art.

An object of the present invention is to provide a digital TV receiver for recovering a symbol clock without being interfered by a phase error of remained phase wave in the carrier recovery.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, the digital TV receiver includes an A/D converter for converting an analog signal into a digital signal, a carrier recovery for converting the digital passband signal into a digital baseband signal, and a symbol clock recovery for converting digital baseband real/imaginary component signals into OQAM (Offset Quadrature Amplitude Modulation) type of real/imaginary component signals, detecting timing error information by high-passband-filtering, squaring, and adding the OQAM real/imaginary signals, and for generating and outputting at least two times the frequency of the symbol clock corrected from the detected timing error information.

In this case, the A/D converter converts the analog passband signal into a passband signal by sampling the analog signal at a fixed frequency generated from the fixed oscillator or at least two times the frequency of the symbol clock. The fixed frequency generated from the fixed oscillator is higher than the at least two times the frequency of the symbol clock. The carrier recovery multiplies the digital passband signal by a standard carrier signal through the carrier recovery process for converting the signal into the digital baseband signal.

In another aspect of the present invention, a digital TV receiver further includes a resampler for resampling the digital real/imaginary baseband signals on at least two times the frequency of the symbol clock frequency, and interpolating each of the signals.

The symbol clock recovery includes an OQAM converter for converting each of the digital baseband real/imaginary signals interpolated and outputted from the resampler into OQAM real/imaginary component signals, a high pass filter performing a high-passband-filtering to the OQAM real/imaginary component signals outputted from the OQAM converter for removing information of data section, a squarer for squaring each of the OQAM real/imaginary component signals filtered by and outputted from the high passband filter, and adding and outputting the calculation, a pre-filter for passing only a frequency of a particular band to recover the symbol clock from the output of the squarer, a timing error detector for detecting timing error information from the output of the pre-filter, a filtering member for filtering only the low passband signal from the timing error information outputted from the timing error detector, and an NCO for generating at least two times the frequency of the symbol clock recovered according to low passband signals of the filtered timing error information and outputting to the first resampler.

The OQAM converter multiplies digital baseband real/imaginary component signals interpolated and outputted from the resampler by a fixed frequency with a center frequency of 2.690559 MHz for converting digital baseband real/imaginary component signals into the OQAM real/imaginary component signals.

The symbol clock recovery includes an OQAM converter for converting each of the digital baseband real/imaginary signals outputted from the carrier recovery into OQAM real/imaginary component signals; a high pass filter performing a high-passband-filtering to the OQAM real/imaginary component signals outputted from the OQAM converter for removing information of data section; a squarer for squaring each of the OQAM real/imaginary component signals filtered by and outputted from the high passband filter, and adding and outputting the calculation; a pre-filter for passing only a frequency of a particular band to recover the symbol clock from the output of the squarer; a timing error detector for detecting timing error information from the output of the pre-filter; a filtering member for filtering only the low passband signal from the timing error information outputted from the timing error detector; and a variable oscillator for generating at least two times the frequency of the symbol clock recovered according to low passband signals of the filtered timing error information and outputting to the A/D converter.

The OQAM converter multiplies the VSB digital baseband real/imaginary component signals outputted from the carrier recovery by the fixed frequency with the center frequency of 2.690559 MHz for converting the VSB digital baseband real/imaginary component signals into the OQAM real/imaginary component signals.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
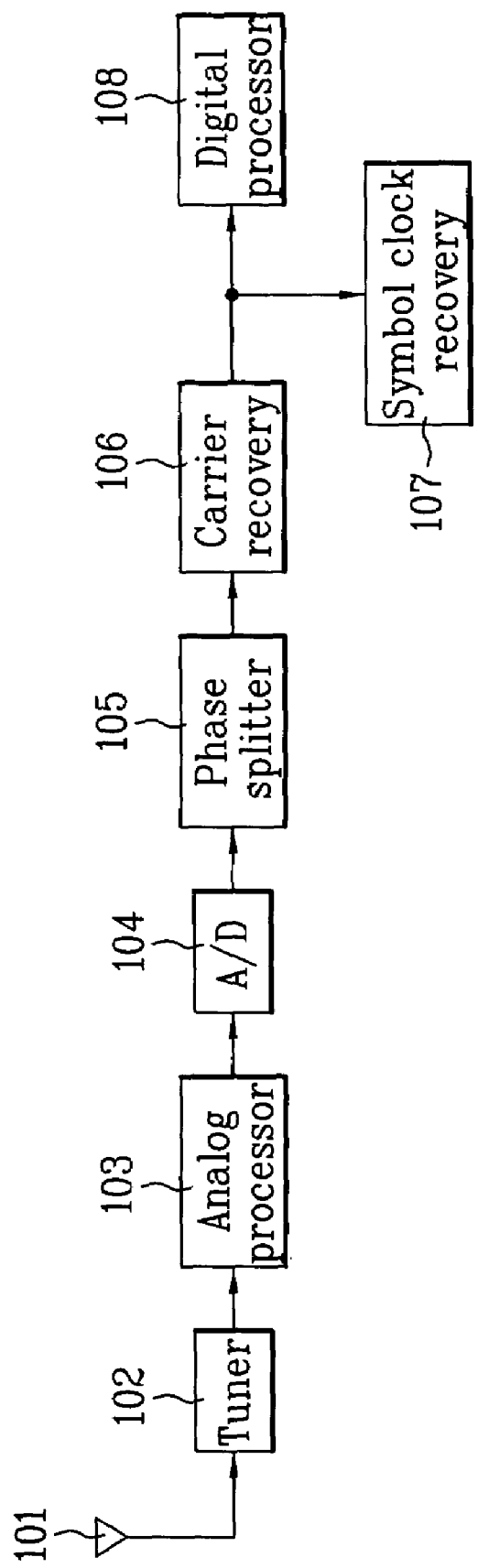
FIG. 1 illustrates a block diagram of a conventional digital TV receiver.
Figure 2:
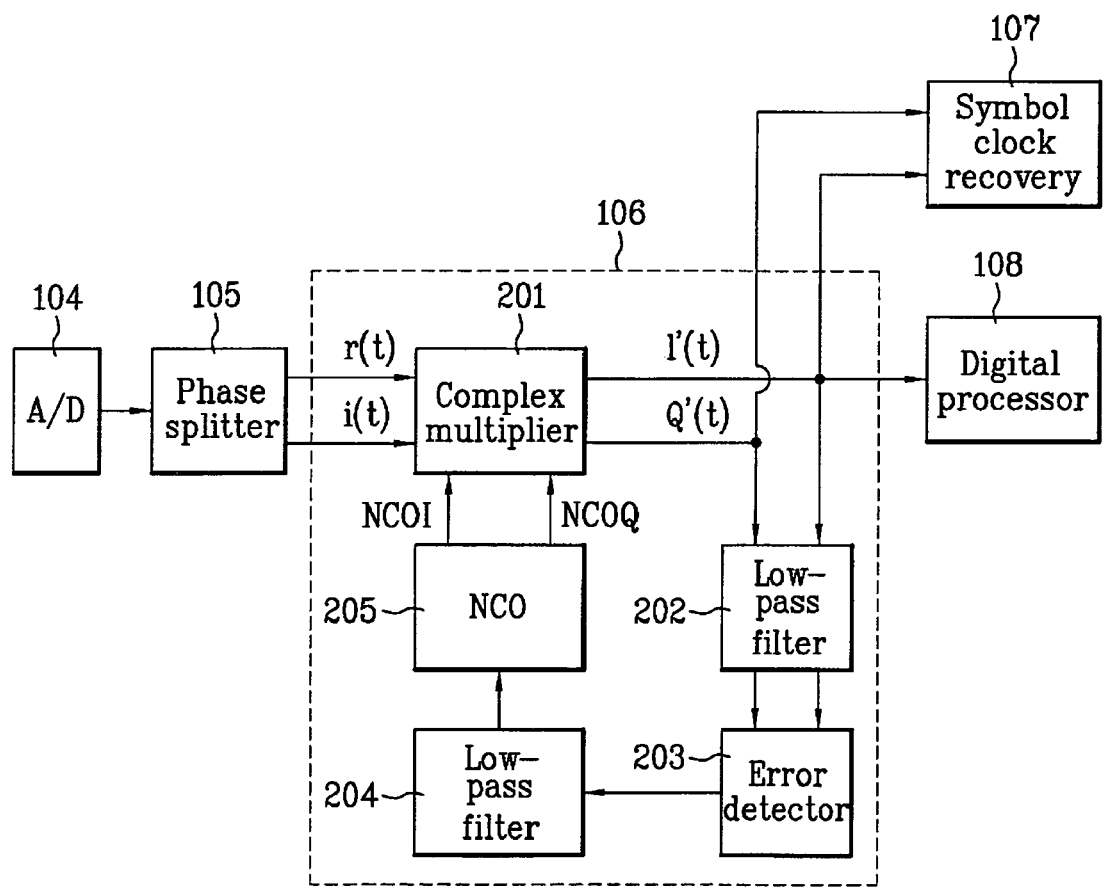
FIG. 2 is a block diagram illustrating a conventional carrier recovery of FIG. 1.
Figure 3:
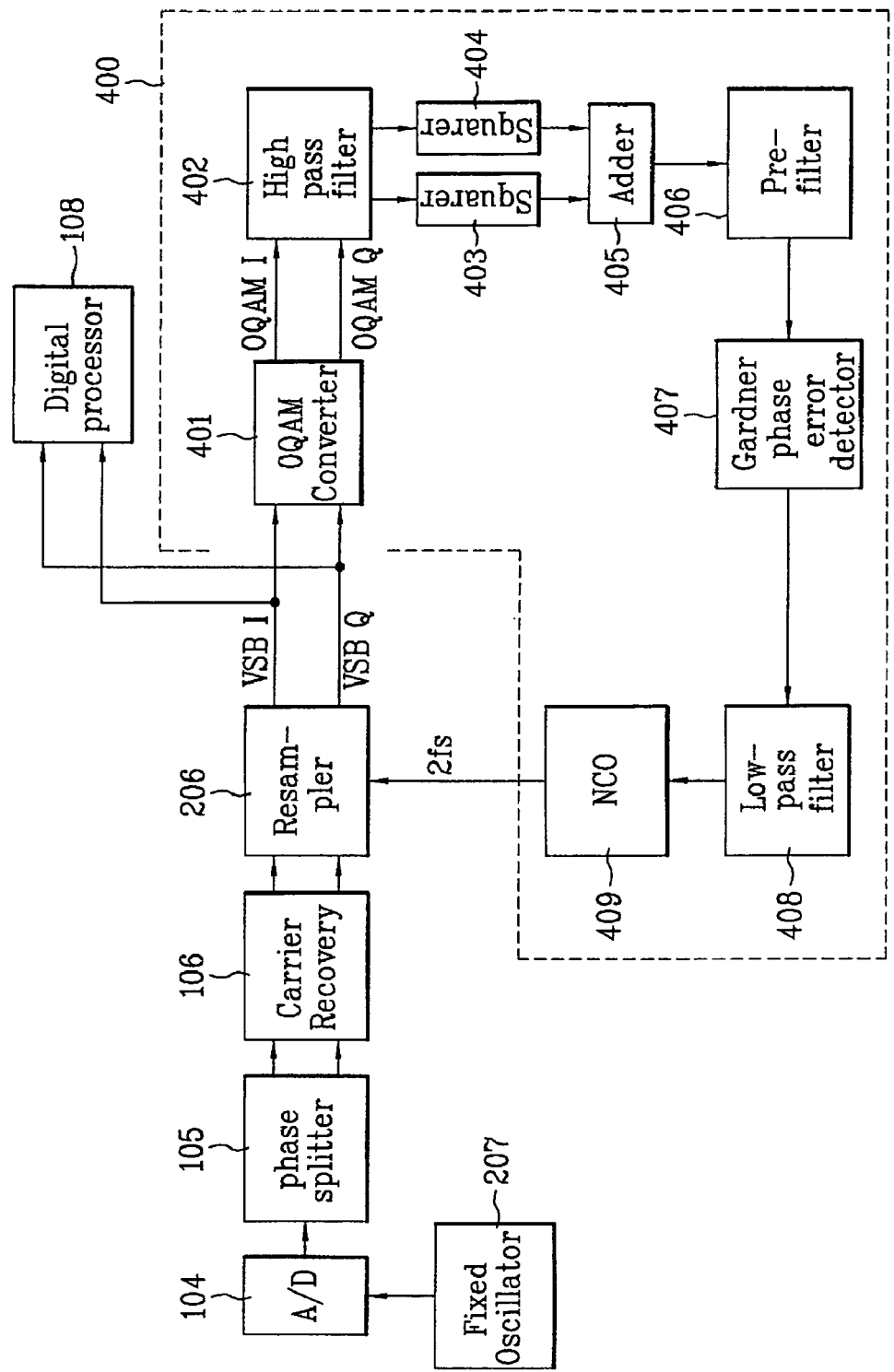
FIG. 3 is a block diagram illustrating a digital TV receiver having a symbol clock recovery according to a first embodiment of the present invention.

FIG. 3 is a block diagram of a digital TV receiver in accordance with a first embodiment of the present invention. Only composition of the symbol clock will be described.

The symbol clock recovery 400 includes an OQAM converter 401 for converting VSB transmitting type of real/imaginary component signals (VSB I and VSB Q) outputted from a resampler 206 into OQAM transmitting type of real/imaginary component signals(OQAM I and OQAM Q), a high pass filter 402 for high-passband-filtering each of the I and Q component signals (OQAM I and OQAM Q), a first squarer 403 for squaring the OQAM real component signal (OQAM I) outputted from the high pass filter 402, a second squarer 404 for squaring the OQAM imaginary component signal (OQAM Q), and adder 405 for adding an output of the first squarer 403 to the output of the second squarer 404, a pre-filter 406 for passing an edge part of the output spectrum of the adder 405, a Gardner phase error detector 407 for outputting timing error information from the signal passed through the pre-filter 406, a low pass filter 408 for filter a low passband signal component from the timing error information outputted from the Gardner phase error detector 407, an NCO 409 for converting the output frequency in accordance with the low passband component of the timing error information and controlling the sampling timing of the resampler 206.

The first embodiment composed as abovementioned shows a case that the A/D converter 104 samples a second IF signal at the fixed frequency, which is different from the symbol clock frequency; and normally 25 MHz, generated from the fixed oscillator 207 so as to digitalize the signal. In other words, although data sampled at 21.52 MHz which is at least two times the frequency of the symbol clock is transmitted at the transmitter, data outputted from the A/D converter 104 is digital data sampled at 25 MHz.

In this case, the fixed frequency oscillated in the fixed oscillator 207 is higher than at least two times the frequency of the symbol clock. Since the data rate is different and there is a difficulty in controlling, the resampler 206 is arranged between the carrier recovery 106 and the symbol clock recovery 400.

The resampler 206 samples the digital baseband signal at the two times the frequency of the symbol clock, i.e., 21.-52 MHz, so as to output the signal for recovering the symbol clock.

The resample 206 performs a role of changing the sampling rate. In other words, the data sampled at 21.-52 MHz and received is sampled at 25 MHz by the A/D converter 104 and outputted. The resampler 206 resamples the data to at least two times the frequency of the symbol clock, i.e., 21.52 MHz and outputs the data.

For this, the resampler 206 interpolates the baseband digital signal passed through and outputted from the A/D converter 104 and the carrier recovery 106 into the digital signal synchronized at the at least two times the frequency 2 fs of the symbol clock by employing the output frequency of the symbol clock recovery 400. The interpolated signals are outputted to the symbol clock recovery 107 as well as to a digital processor 108 for performing channel lighting, phase tracking, and an error correcting.

The symbol clock recovery 400 obtains the timing error of the current symbol clock and generates the frequency proportion to the timing error so as to output the frequency to the resampler 206.

The OQAM converter 401 of the symbol clock recovery 400 multiplies VSB I and Q signals resampled at 21.-52 MHz and outputted from the resampler 206 by the fixed oscillating frequency with a center frequency for converting the baseband VSB I and Q signals into OQAM I and Q signals, and outputs the signals to the high pass filter 402.

Figure 4A:
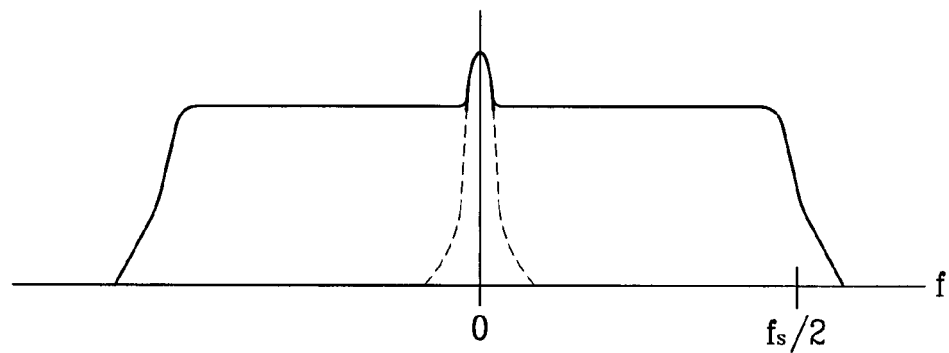
FIG. 4A to FIG. 4D are diagrams of spectrum illustrating each part of a symbol clock recovery of FIG. 3.
Figure 4B:
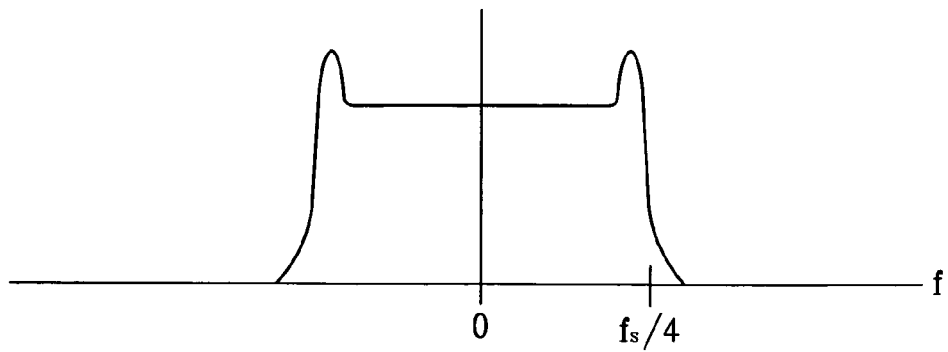
Figure 4C:
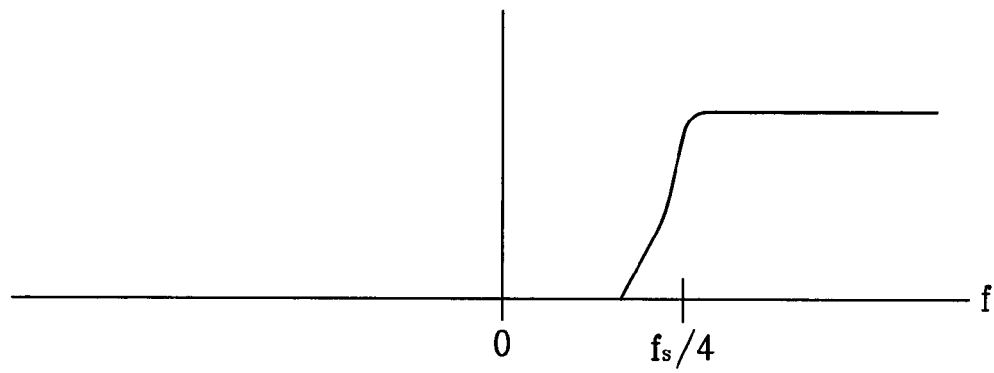
Figure 4D:
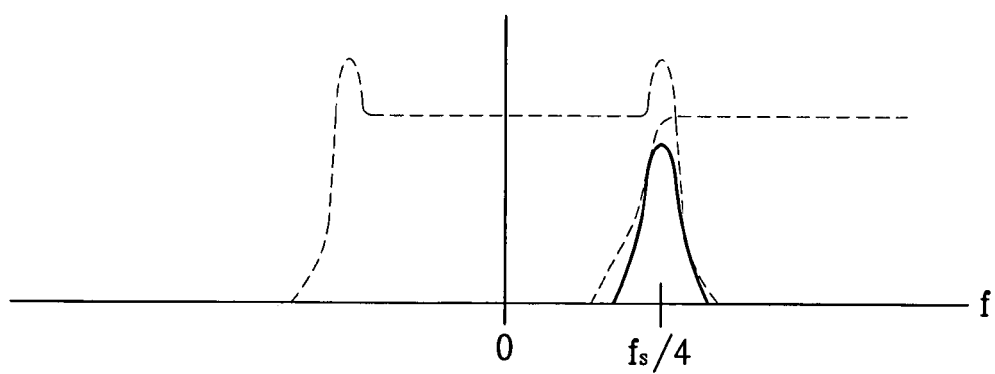

FIGS. 4A to 4D illustrated a frequency spectrum for the real component signal. FIG. 4A illustrates a VSB baseband I signal inputted to the OQAM converter 401 and FIG. 4B illustrates an OQAM I signal outputted from the OQAM converter 401. FIG. 4C is a frequency characteristic of the high pass filter 402, and FIG. 4D illustrates an OQAM I signal having a frequency characteristic and passed through the high pass filter 402. In other words, the high pass filter 402 removes information of the data section from the OQAM I and Q signals and outputs the signals to the first squarer 403 and second squarer 404.

Each of the first and second squarers 403 and 404 squares each of the OQAM I and OQAM Q signals and outputs the result to the adder 405, the adder 405 adds the squared OQAM I and OQAM Q signals so as to output the signals to the pre-filer 406.

The pre-filter 406 passes only the edge portion of the spectrum for obtaining the timing error information from the signal outputted from the adder 405, and outputs the signal to the Gardner phase error detector 407. The Gardner phase error detector 407 multiplies a difference between two symbol samples by one of middle sample values so as to obtain the timing error information and outputs the signal to the loop-filter 408. The loop-filter 408 filter only low passband signal component from the timing error information detected from the Gardner phase error detector 407 and outputs the component to the NCO 409. The NCO 409 converts the output frequency in accordance with the low passband component of the timing error information so as to control the sampling timing of the resampler 206.

Figure 5:
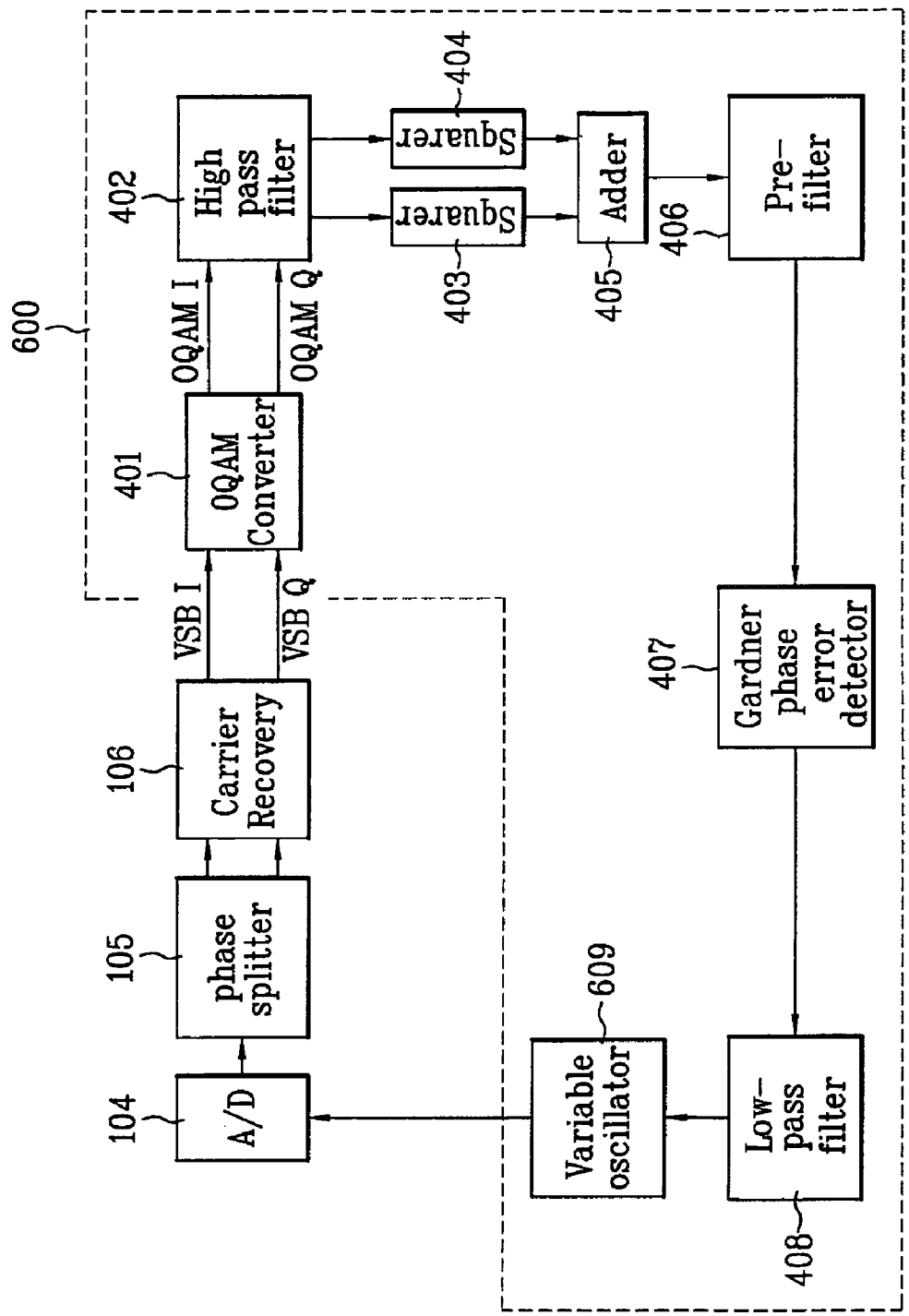
FIG. 5 is a block diagram illustrating a digital TV receiver according to a second embodiment of the present invention.

FIG. 5 illustrates a block diagram of the digital TV receiver in accordance with the second embodiment of the present invention. In the second embodiment, the frequency inputted to the A/D converter 104 is not the fixed frequency but the at least two times the frequency of the symbol clock although the movement and structure of the symbol clock recovery is the same as FIG. 3. In the case of FIG. 5, the A/D converter 104 samples the second IF signal to at least two times the frequency of the symbol clock and converts the signal into the digital passband signal, thereby, the resampler is not needed between the carrier recovery 106 and the symbol clock recovery 600.

In this case, an output of the loop filter 408 low passband filtering the timing error information of the current symbol detected from the symbol clock recovery 600 is inputted to a variable oscillator 609 newly generating at least two times the frequency of the symbol clock. The variable oscillator 609 newly generates at least two times the frequency of the symbol clock from the low passband filtered timing error information so as to output to the A/D converter 104.

In this instance, the OQAM converter is not necessary at all when there is no high pass filter at the symbol clock recovery in the first and second embodiments of the present invention because outputs of the two squarers and the adder are converted into a signal in FIG. 3 even if an input signal is not the baseband signal. However, when the high pass filter is employed at a front end of the two squarers, most of frequency areas with the data are removed, and only the component needed for the symbol clock recovery is inputted to the squarers so as to improve the remained jitter characteristic of the symbol clock recovery. When there is a heavy noise in the transmitting channel owing to a multi-passage, an efficiency of the symbol clock recovery is increased because the symbol clock recovery is not interfered by the movement of data. The present invention may be applied to all ATSC types of digital broadcasting receiver employing the VSB modulation.

According to the digital TV receiver and the symbol clock recovery of the present invention, the VSB digital baseband real/imaginary component signals are converted into an OQAM type of real/imaginary component signals and the symbol clock recovery is performed, thereby the symbol clock recovery performs without being interfered by the remained carrier component of the symbol clock recovery.

Particularly, in the present invention, the symbol clock recovery is exactly performed even when there is a noise in the transmitting channel resulted form the multi-passage by effectively reducing the frequency signal around the information employed by the symbol clock recovery, thereby not only the efficiency of an algorism of the symbol clock recovery but also the efficiency of a whole system are increased.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A digital TV receiver, comprising:
   an A/D converter for converting an analog passband signal into a digital passband signal;
   a carrier recovery for converting the digital passband signal into a digital baseband signal; and
   a symbol clock recovery for converting digital real/imaginary baseband component signals into OQAM type of real/imaginary component signals, detecting timing error information by high-passband-filtering, squaring, and adding the OQAM real/imaginary signals, and for generating and outputting at least two times the frequency of the symbol clock corrected from the detected timing error information.

2. The digital TV receiver of claim 1 further comprises a fixed oscillator for oscillating at a fixed frequency, wherein the A/D converter converts the analog passband signal into the digital passband signal by sampling the analog passband signal at the fixed frequency generated from the fixed oscillator or at least two times the frequency of the symbol clock.

3. The digital TV receiver of claim 2, wherein the fixed frequency generated from the fixed oscillator is higher than at least two times the frequency of the symbol clock.

4. The digital TV receiver of claim 1, wherein the carrier recovery multiplies the digital passband signal by a standard carrier signal through the carrier recovery process for converting the signal into the digital baseband signal.

5. The digital TV receiver of claim 1 further comprises a resampler for resampling the digital real/imaginary baseband signals to at least two times the frequency of the symbol clock frequency, and interpolating each of the signals.

6. The digital TV receiver of claim 5, wherein the symbol clock recovery comprises:
   an OQAM converter for converting each of the digital baseband real/imaginary signals interpolated and outputted from the resampler into OQAM real/imaginary component signals;
   a high pass filter for performing a high-passband-filtering to the OQAM real/imaginary component signals outputted from the OQAM converter for removing information of data section;
   a squarer for squaring each of the OQAM real/imaginary component signals filtered by and outputted from the high passband filter, and adding and outputting the calculation;
   a pre-filter for passing only a frequency of a particular band to recover the symbol clock from the output of the squarer;
   a timing error detector for detecting timing error information from the output of the pre-filter;
   a filtering member for filtering only the low passband signal from the timing error information outputted from the timing error detector; and
   an NCO for generating at least two times the frequency of the symbol clock recovered according to low passband signals of the filtered timing error information and outputting to the resampler.

7. The digital TV receiver of claim 6, wherein the OQAM converter multiplies digital baseband real/imaginary component signals interpolated and outputted from the resampler by a fixed frequency with a center frequency of 2.690559 MHz for converting digital baseband real/imaginary component signals into the OQAM real/imaginary component signals.

8. The digital TV receiver of claim 1, wherein the symbol clock recovery comprises:
   an OQAM converter for converting each of the digital baseband real/imaginary signals outputted from the carrier recovery into OQAM real/imaginary component signals;
   a high pass filter for performing a high-passband-filtering to the OQAM real/imaginary component signals outputted from the OQAM converter for removing information of data section;
   a squarer for squaring each of the OQAM real/imaginary component signals filtered by and outputted from the high passband filter, and adding and outputting the calculation;
   a pre-filter for passing only a frequency of a particular band to recover the symbol clock from the output of the squarer;
   a timing error detector for detecting timing error information from the output of the pre-filter;
   a filtering member for filtering only the low passband signal from the timing error information outputted from the timing error detector; and
   a variable oscillator for generating at least two times the frequency of the symbol clock recovered according to low passband signals of the filtered timing error information and outputting to the A/D converter.

9. The digital TV receiver of claim 8, wherein the OQAM converter multiplies the VSB digital baseband real/imaginary component signals outputted from the carrier recovery by the fixed frequency with a center frequency of 2.690559 MHz for converting the VSB digital baseband real/imaginary component signals into the OQAM real/imaginary component signals.

10. A digital TV receiver, comprising:

an A/D converter for taking a sample of a fixed frequency from a VSB type of analog passband signal for converting the signal into a digital passband signal;

a carrier recovery for multiplying the VSB digital passband signal by a standard carrier signal generated from the carrier recovery process for converting the signal into a VSB digital baseband signal;

a resampler for taking a sample of at least two times the frequency of the symbol clock from the VSB digital baseband real/imaginary signals generated from the carrier recovery so as to interpolate the signals; and a symbol clock recovery for converting the VSB digital real/imaginary baseband component signals into OQAM type of real/imaginary component signals, detecting timing error information by high-passband-filtering, squaring, and adding the OQAM real/imaginary signals, and generating and outputting at least two times the frequency of the symbol clock corrected from the detected timing error information.

11. The digital TV receiver of claim 10, wherein the symbol clock recovery comprises:

an OQAM converter for converting each of the digital baseband real/imaginary signals interpolated and outputted from the resampler into OQAM real/imaginary component signals;

a high pass filter for performing a high-passband-filtering to the OQAM real/imaginary component signals outputted from the OQAM converter for removing information of data section;

a squarer for squaring each of the OQAM real/imaginary component signals filtered by and outputted from the high passband filter, and adding and outputting the calculation;

a pre-filter for passing only a frequency of a particular band to recover the symbol clock from the output of the squarer;

a timing error detector for detecting timing error information from the output of the pre-filter;

a filtering member for filtering only the low passband signal from the timing error information outputted from the timing error detector; and an NCO for generating at least two times the frequency of the symbol clock recovered according to low passband signals of the filtered timing error information and outputting to the resampler.

12. The digital TV receiver of claim 11, wherein the OQAM converter multiplies digital baseband real/imaginary component signals interpolated and outputted from the resampler by a fixed frequency with a center frequency of 2.690559 MHz for converting digital baseband real/imaginary component signals into the OQAM real/imaginary component signals.

13. A digital TV receiver, comprising:

an A/D converter for taking a sample of at least two times the frequency of the symbol clock from a VSB analog passband signal for converting the signal into a digital passband signal;

a carrier recovery for multiplying the VSB digital passband signal by a standard carrier signal generated from the carrier recovery process for converting the signal into a VSB digital baseband signal;

a resampler for taking a sample of at least two times the frequency of the symbol clock from the VSB digital baseband real/imaginary signals generated from the carrier recovery and interpolating the signals; and a symbol clock recovery for converting the VSB digital baseband real/imaginary component signals into OQAM type of real/imaginary component signals, detecting timing error information by high-passband-filtering, squaring, and adding the OQAM real/imaginary signals, and generating and outputting at least two times the frequency of the symbol clock corrected from the detected timing error information.

14. The digital TV receiver of claim 13, wherein the symbol clock recovery comprises:

an OQAM converter for converting each of the VSB digital baseband real/imaginary signals outputted from the carrier recovery into OQAM real/imaginary component signals;

a high pass filter for performing a high-passband-filtering to the OQAM real/imaginary component signals outputted from the OQAM converter for removing information of data section;

a squarer for squaring each of the OQAM real/imaginary component signals filtered by and outputted from the high passband filter, and adding and outputting the calculation;

a pre-filter for passing only a frequency of a particular band to recover the symbol clock from the output of the squarer;

a timing error detector for detecting timing error information from the output of the pre-filter;

a filtering member for filtering only the low passband signal from the timing error information outputted from the timing error detector; and a variable oscillator for generating at least two times the frequency of the symbol clock recovered according to low passband signals of the filtered timing error information and outputting to the A/D converter.

15. The digital TV receiver of claim 14, wherein the OQAM converter multiplies the VSB digital baseband real/imaginary component signals outputted from the carrier recovery by the fixed frequency with a center frequency of 2.690559 MHz for converting the VSB digital baseband real/imaginary component signals into the OQAM real/imaginary component signals.

* * * * *